(12) United States Patent
Ichikawa et al.

(10) Patent No.: US 11,831,209 B2
(45) Date of Patent: Nov. 28, 2023

(54) MOTOR CONTROL DEVICE INCLUDING A SHIELD PLATE, AND ELECTRIC POWER STEERING CONTROL DEVICE

(71) Applicant: Mitsubishi Electric Corporation, Tokyo (JP)

(72) Inventors: Takanori Ichikawa, Tokyo (JP); Kazuhisa Takashima, Tokyo (JP); Kentaro Urimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1079 days.

(21) Appl. No.: 16/325,217

(22) PCT Filed: Sep. 12, 2016

(86) PCT No.: PCT/JP2016/076813
§ 371 (c)(1),
(2) Date: Feb. 13, 2019

(87) PCT Pub. No.: WO2018/047342
PCT Pub. Date: Mar. 15, 2018

(65) Prior Publication Data
US 2019/0207488 A1 Jul. 4, 2019

(51) Int. Cl.
*H02K 5/10* (2006.01)
*H02K 9/22* (2006.01)
(Continued)

(52) U.S. Cl.
CPC .............. *H02K 11/33* (2016.01); *H02K 5/10* (2013.01); *H02K 9/227* (2021.01); *H02K 11/0141* (2020.08); *H02K 11/30* (2016.01)

(58) Field of Classification Search
CPC ............ H02K 5/10; H02K 9/22; H02K 9/223; H02K 9/227; H02K 11/01; H02K 11/14;
(Continued)

(56) References Cited

U.S. PATENT DOCUMENTS

2010/0320880 A1 12/2010 Kamogi
2010/0328901 A1* 12/2010 Minato ................. H01L 21/561
361/730

(Continued)

FOREIGN PATENT DOCUMENTS

EP 2371673 A2 * 10/2011 ........... B62D 5/0406
JP 2002-136055 A 5/2002
(Continued)

OTHER PUBLICATIONS

ASAO, Machine Translation of WO2015125234, Aug. 2015 (Year: 2015).*

(Continued)

*Primary Examiner* — Eric Johnson
(74) *Attorney, Agent, or Firm* — Sughrue Mion, PLLC; Richard C. Turner (57) ABSTRACT

Provided are a motor control device including: a motor case including a motor; a housing, which is provided to have a power supply connector mounted thereon and cover an upper portion of the motor case; and a control unit, which is arranged on a side opposite to an output side on an output shaft of the motor in a space formed by the motor case and the housing, and an electric power steering control device. The control unit includes a filter portion, which is arranged in an upper portion of the control unit and is connected to the power supply connector, a control board, which is arranged below the filter portion and has mounted thereon circuit components configured to supply an electric current to the motor, and a shield plate, which is arranged between the filter portion and the control board and is grounded to the motor case.

15 Claims, 4 Drawing Sheets

(51) Int. Cl.
*H02K 11/01* (2016.01)
*H02K 11/30* (2016.01)
*H02K 11/33* (2016.01)

(58) Field of Classification Search
CPC ...... H02K 11/141; H02K 11/30; H02K 11/33; H02K 11/40
See application file for complete search history.

(56) References Cited

U.S. PATENT DOCUMENTS

| | | | |
|---|---|---|---|
| 2012/0229005 A1 | 9/2012 | Tominaga et al. | |
| 2012/0320544 A1 | 12/2012 | Ohhashi et al. | |
| 2013/0257232 A1* | 10/2013 | Tomizawa | H02K 29/08 310/68 R |
| 2015/0171709 A1* | 6/2015 | Ito | H02K 9/22 310/52 |
| 2015/0180316 A1* | 6/2015 | Maeshima | H02K 5/225 310/71 |
| 2015/0222156 A1 | 8/2015 | Tomizawa et al. | |
| 2017/0005539 A1* | 1/2017 | Yamasaki | H02K 5/02 |
| 2018/0248451 A1* | 8/2018 | Hagiwara | H02K 11/02 |

FOREIGN PATENT DOCUMENTS

| | | |
|---|---|---|
| JP | 2008-228380 A | 9/2008 |
| JP | 2011-200022 A | 10/2011 |
| JP | 2015-144507 A | 8/2015 |
| WO | 2015/049791 A1 | 4/2015 |
| WO | 2015/122069 A1 | 8/2015 |
| WO | WO-2015125234 A1 * | 8/2015 ............. H02K 11/33 |

OTHER PUBLICATIONS

International Search Report of PCT/JP2016/076813 dated Oct. 18, 2016 [PCT/ISA/210].

Communication dated Jul. 19, 2019, from the European Patent Office in counterpart European Application No. 16915760.9.

* cited by examiner

MOTOR CONTROL DEVICE INCLUDING A SHIELD PLATE, AND ELECTRIC POWER STEERING CONTROL DEVICE

CROSS REFERENCE TO RELATED APPLICATIONS

This application is a National Stage of International Application No. PCT/JP2016/076813, filed Sep. 12, 2016.

TECHNICAL FIELD

The present invention relates to a motor control device and an electric power steering control device, and particularly, to a countermeasure for noise from a control unit in a motor control device where a motor and the control unit are integrated and in an electric power steering control device.

BACKGROUND ART

Among related-art electric steering devices, there are a motor control device and an electric power steering control device in which a motor includes a stator winding, a control unit includes an inverter circuit configured to control an electric current to flow through the winding, and further the control unit is arranged on an output shaft of the motor and integrated on a side opposite to an output side of the output shaft (Patent Literature 1).

CITATION LIST

Patent Literature

[PTL 1] WO 2015/049791 A1

SUMMARY OF INVENTION

Technical Problem

In the electronic control device disclosed in Patent Literature 1, the control unit is arranged on the side opposite to the output side of the output shaft of the motor, and a plurality of connectors and components of a power supply circuit unit are mounted in a connector case covering the control unit. Therefore, the power supply circuit unit, which is a relatively large component, is not arranged in the control unit, but is arranged separately from the control unit to downsize the electronic control device. The components (capacitors and coil) of the power supply circuit unit are connected to power supply conducting bars extending from a power supply connector, and is effective against noise emission from the power supply circuit unit to the outside of the electronic control device.

However, a control board in the control unit performs PWM control on a large electric current with the inverter circuit and hence emits noise to the outside, and there is still room for improvement in such noise emission.

The present invention has been made to solve the above-mentioned problem, and therefore has an object to provide a motor control device and an electric power steering control device, which are configured to suppress noise emission from inside a control unit.

Solution to Problem

In order to achieve the above-mentioned object, according to one embodiment of the present invention, there is provided a motor control device including: a motor case including a motor; a housing, which is provided to have a power supply connector mounted thereon and cover an upper portion of the motor case; and a control unit, which is arranged on a side opposite to an output side on an output shaft of the motor in a space formed by the motor case and the housing, wherein the control unit includes: a filter portion, which is arranged in an upper portion of the control unit and is connected to the power supply connector; a control board, which is arranged below the filter portion and has mounted thereon circuit components configured to supply an electric current to the motor; and a shield plate, which is arranged between the filter portion and the control board and is grounded to the motor case.

Further, in order to achieve the above-mentioned object, according to one embodiment of the present invention, there is provided an electric power steering control device including the above-mentioned motor control device, the electric power steering control device being configured to generate steering assistance torque with the motor.

Advantageous Effects of Invention

According to the embodiments of the present invention, in the motor control device in which the motor and the control unit are integrated, the control unit includes the shield plate, which is arranged between the filter portion connected to the power supply connector and the control board having mounted thereon the circuit components configured to supply the electric current to the motor, and which is grounded to the motor case, and hence there is provided the effect that emission of noise generated from the circuit components of the control board to the outside can be suppressed by the shield plate.

DESCRIPTION OF EMBODIMENTS

Now, each embodiment of the present invention common to a motor control device and an electric power steering control device is described in detail with reference to the accompanying drawings.

First Embodiment

Figure 1:
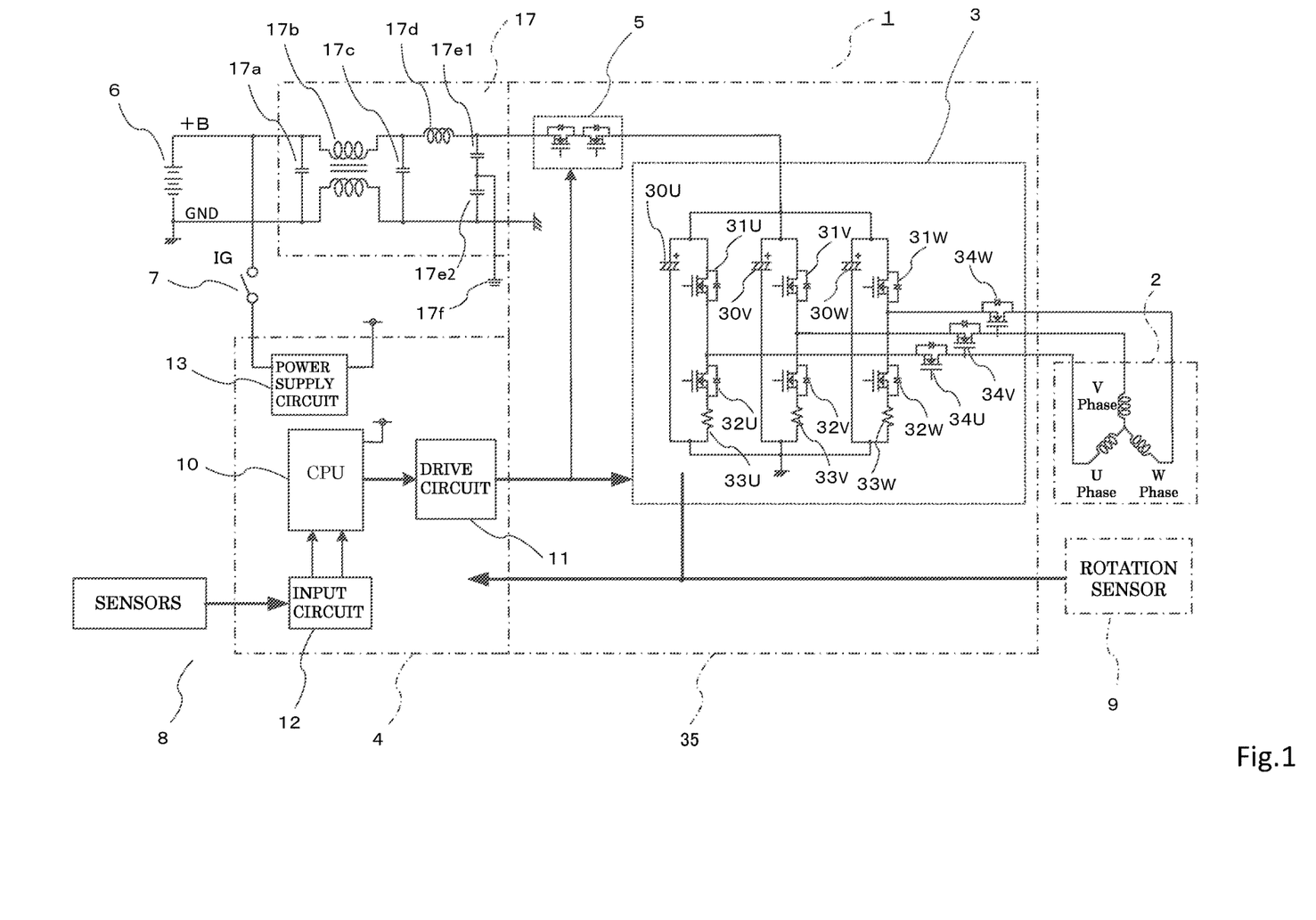
FIG. 1 is an overall electrical circuit diagram common to a motor control device and an electric power steering control device according to a first embodiment of the present invention.

In FIG. 1, in which an electrical system common to a motor control device and an electric power steering control device according to a first embodiment of the present invention is illustrated, a control unit 1 mainly includes an inverter circuit 3 configured to supply an electric current to a motor 2, a control circuit unit 4 having a CPU 10 mounted thereon, a switching element 5 for a power supply relay, and a filter portion 17 configured to suppress noise from the inverter circuit 3. The control unit 1 is used for an electric power steering operation, for example.

The filter portion 17 has connected thereto a battery power line (power +B) and a ground line (GND) from a battery 6 mounted on a vehicle, and is powered on by an ignition switch 7 via a power supply circuit 13 of the control circuit unit 4. Further, sensors 8 including a torque sensor (not shown), which is mounted in the vicinity of a steering wheel and is configured to detect steering torque, and a speed sensor configured to detect a travel speed of the vehicle, for example, are provided. The power supplied from the power supply circuit 13 via the filter portion 17 and the switching element 5 for the power supply relay serves as a current source of the inverter circuit 3. The filter portion 17 includes a common mode coil 17b, a normal mode coil 17d, and capacitors 17a, 17c, 17e1, and 17e2. However, depending on the noise generated by the device, the filter portion 17 may include only one of the coils 17b and 17d, and the number of capacitors may further be reduced.

Information from the sensors 8 is transmitted to the CPU 10 via an input circuit 12 of the control circuit unit 4. The CPU 10 computes a control amount corresponding to an electric current for rotating the motor 2 based on those pieces of information, and outputs the control amount. The output signal from the CPU 10 is transmitted to a drive circuit 11 and the inverter circuit 3, which form output circuits. Of the output circuits, the drive circuit 11 receives a command signal from the CPU 10, and outputs a drive signal for driving switching elements of the inverter circuit 3. The drive circuit 11, through which only a small electric current flows, is arranged in the control circuit unit 4, but may be arranged in the inverter circuit 3.

The inverter circuit 3 mainly includes switching elements 31U, 31V, and 31W (hereinafter sometimes collectively denoted by the reference numeral "31") for an upper arm and switching elements 32U, 32V, and 32W (hereinafter sometimes collectively denoted by the reference numeral "32") for a lower arm, switching elements 34U, 34V, and 34W (hereinafter sometimes collectively denoted by the reference numeral "34") for a motor relay configured to connect/disconnect wires to/from motor windings, shunt resistors 33U, 33V, and 33W (hereinafter sometimes collectively denoted by the reference numeral "33") configured to detect electric currents, and further capacitors 30U, 30V, and 30W (hereinafter sometimes collectively denoted by the reference numeral "30") for suppressing noise, for respective three-phase windings (U, V, and W) of the motor 2. The same circuit configuration is adopted for the winding of each phase, and the electric current can be supplied independently for the winding of each phase.

Moreover, although not shown, a potential difference between both ends of each of the shunt resistors 33, winding terminal voltages of the motor 2, and other such information are also fed back to the input circuit 12. Those pieces of information are also input to the CPU 10, and feedback control is performed by computing differences from detection values corresponding to calculated current values to supply a desired motor current and assist in a steering force.

Further, a drive signal for the switching element 5 for the power supply relay, which serves as a relay configured to connect/disconnect the battery +B line to/from a power supply line of the inverter circuit 3 is also output from the drive circuit 11, and supply of an electric current to the motor 2 itself can be interrupted by the switching element 5. The switching elements 34 for the motor relay are also arranged in the inverter circuit 3, and can interrupt the respective phases. The switching element 5 for the power supply relay, which allows a large current to flow therethrough to generate heat, may also be included in the inverter circuit 3.

The CPU 10 has an abnormality detection function of detecting abnormalities of the sensors 8 as well as the drive circuit 11, the inverter circuit 3, and motor windings. For example, when being detected an abnormality, the CPU 10 is configured to turn off switching elements 31 and 32 or a switching element 34 for the motor relay of a predetermined phase so as to interrupt the supply of current only for the phase depending on the abnormality. Further, in order to interrupt all electric currents, the CPU 10 may turn off the switching element 5 for the power supply relay so as to interrupt the power itself at its source.

The motor 2 is a brushless motor in which three-phase windings are star-connected. Being the brushless motor, the motor 2 has mounted thereon a rotation sensor 9 configured to detect a rotational position of a rotor. Rotation information from the rotation sensor 9 is also fed back to the input circuit 12. Instead of the three-phase star-connected brushless motor, the motor 2 may be a delta-connected brushless motor, or two bipolar pairs of brushed motors. Moreover, as in the related-art device, specifications of the windings may adopt distributed winding or concentrated winding.

Next, surroundings of the filter portion 17 are described. The filter portion 17 is inserted such that so-called switching noise generated by the PWM control by the control unit 1, in particular, the inverter circuit 3, is not propagated from this device to the outside. The coil 17b is for common mode noise and is called "common mode coil", and the coil 17d is for normal mode noise and is called "normal mode coil".

Moreover, the capacitors 17a and 17c are capacitors called "across-the-line capacitors" or "X capacitors", and the capacitors 17e1 and 17e2 are capacitors called "line bypass capacitors" or "Y capacitors". Conducted noise and radiated noise are suppressed with those filter elements, and the filter portion 17 is called "electromagnetic interference (EMI) filter". A midpoint 17f between the Y capacitors 17e1 and 17e2 is a body ground, and is electrically connected to a vehicle body via a part of the device to be grounded.

The structure of FIG. 2 obtained by integrating the motor 2 and the control unit 1, which are common to the motor control device and the electric power steering control device including the above-mentioned electric circuit, is described below.

Figure 2:
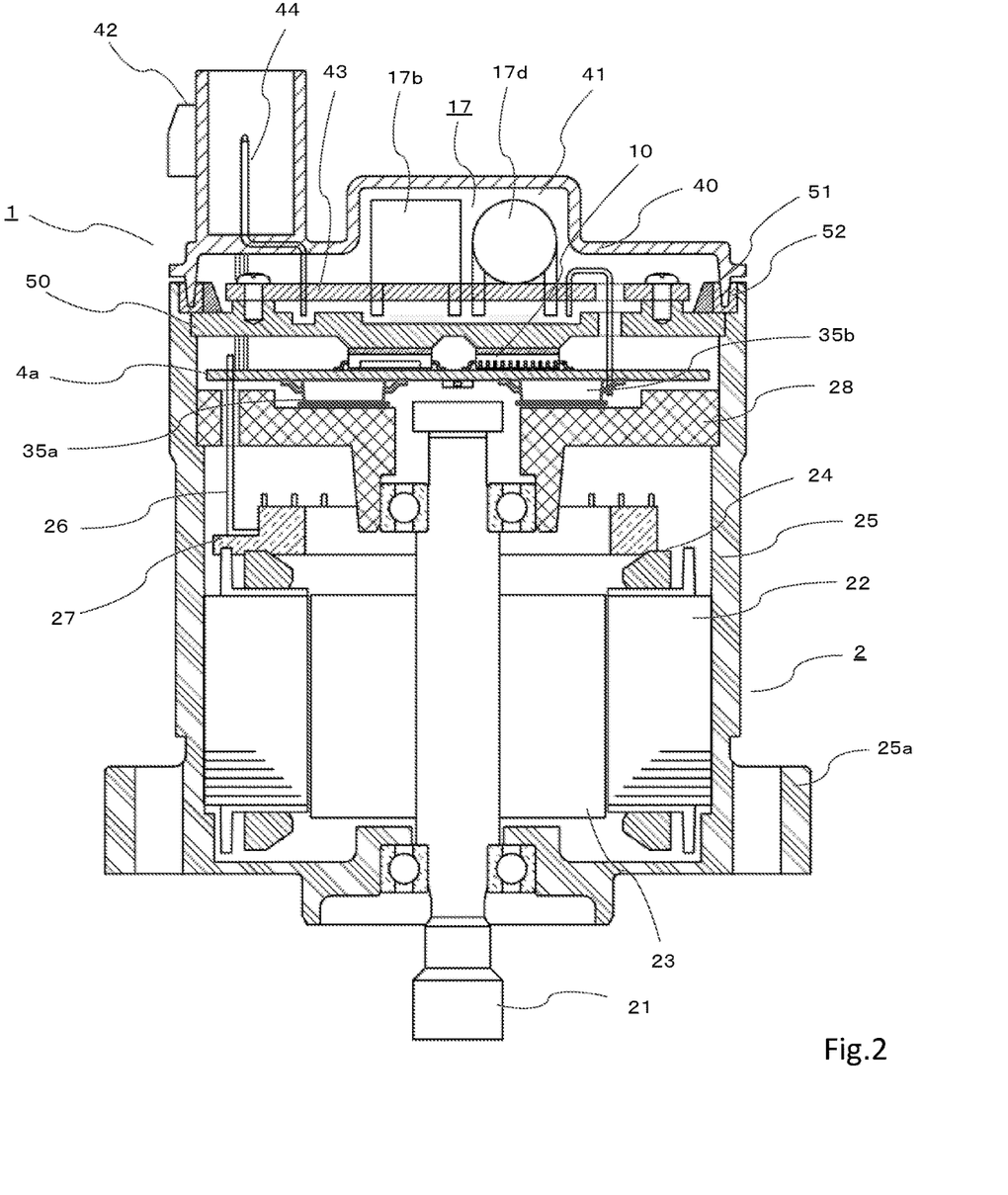
FIG. 2 is a cross-sectional view for illustrating the overall mechanical structure common to the motor control device and the electric power steering control device according to the first embodiment of the present invention.

The motor 2 is arranged on a lower side of FIG. 2, and the control unit 1 is arranged on an upper side of FIG. 2. The motor 2 and the control unit 1 are integrated on the same axis of a motor output shaft 21. The motor 2 is installed in a motor case 25 as with the related-art equipment, and has arranged therein a rotor 23, which has permanent magnets arranged in a plurality of pole pairs around an output shaft 21, and a stator 22, around which windings 24 are wound and which has a gap from the rotor 23. Each of the windings 24 is wound for each of the three phases. An annular connection ring 27 is arranged closely above the windings for connection, and for winding ends of the three phases three extended winding ends 26 are extended to the control unit 1. Moreover, a frame 28 is provided at a boundary between the control unit 1 and the motor 2. In the frame 28, a hole is formed at a center thereof to hold a bearing and allow the motor output shaft 21 and the winding ends 26 to pass therethrough.

The control unit 1 includes a control board 4a having mounted thereon the inverter circuit 3, the control circuit unit 4, and the switching element 5 for the power supply relay in FIG. 1. An upper portion of the control unit 1 is covered by a housing 40, and the housing 40 forms at substantially the center thereof a filter chamber 41 containing the filter portion 17, which is formed of the coils 17b and 17d, and having a convex cross section. Further, a power supply connector 42 is arranged in the vicinity of the filter chamber 41 and in an outermost portion of the housing 40. The power supply connector 42, the housing 40, and an upper portion of the filter chamber 41 are integrally molded with a resin material.

The control board 4a has mounted thereon circuit components configured to supply electric currents to the motor 2, such as the control circuit unit 4 and the inverter circuit 3 in FIG. 1. In other words, the CPU 10 is arranged on an upper surface of the control board 4a, and power modules 35a and 35b (hereinafter sometimes collectively denoted by reference numeral "35" illustrated in FIG. 1) having mounted thereon the switching elements 31, 32, and 34 (see FIG. 1) and other such circuit components are arranged on a lower surface of the control board 4a. The power modules 35 each includes an inverter circuit for one phase of the windings 24, for example, and three power modules 35 (in FIG. 2, only two power modules 35a and 35b are illustrated) are arranged for three phases. The power modules 35a and 35b configured to supply electric currents to the windings 24 of the motor 2 are controlled and hence generate heat, and therefore abut the frame 28 such that heat can be dissipated to the frame 28. Therefore, the frame 28 also serves as a heat sink. The winding ends 26 are connected to a wiring pattern or terminals (both not shown) of the control board 4a.

The filter portion 17 included in the filter chamber 41 includes the components illustrated in FIG. 1, but only the coils 17b and 17d, which are large components, are illustrated in FIG. 2. The filter portion 17 and power supply conductive wires (+B and GND lines) extending from a terminal 44 of the power supply connector 42 are integrally held by an insulating resin member 43. Further, terminals of the coils 17b and 17d and the capacitors 17a, 17c, 17e1, and 17e2 are connected to the power supply conductive wires.

The control board 4a including main components, such as the power modules 35a and 35b of the inverter circuit 3, in particular, of the control unit 1 is contained inside the motor case 25. In order to suppress emission of electric field noise, the motor case 25 made of a metal, in particular, the motor case 25 made of aluminum is used. Further, a mounting portion 25a used for mounting to the vehicle body is provided to the motor case 25. The mounting portion 25a and the vehicle body are fixed with bolts or other such members to form electrical body ground.

Meanwhile, the housing 40 includes the power supply connector 42 and other such members, and hence is preferred to be made of a resin. However, a countermeasure for suppressing the noise emission from the control board 4a is required in this region. Therefore, a shield plate 50 made of a metal is arranged between the control board 4a and a lower surface of the housing 40.

Figure 3:
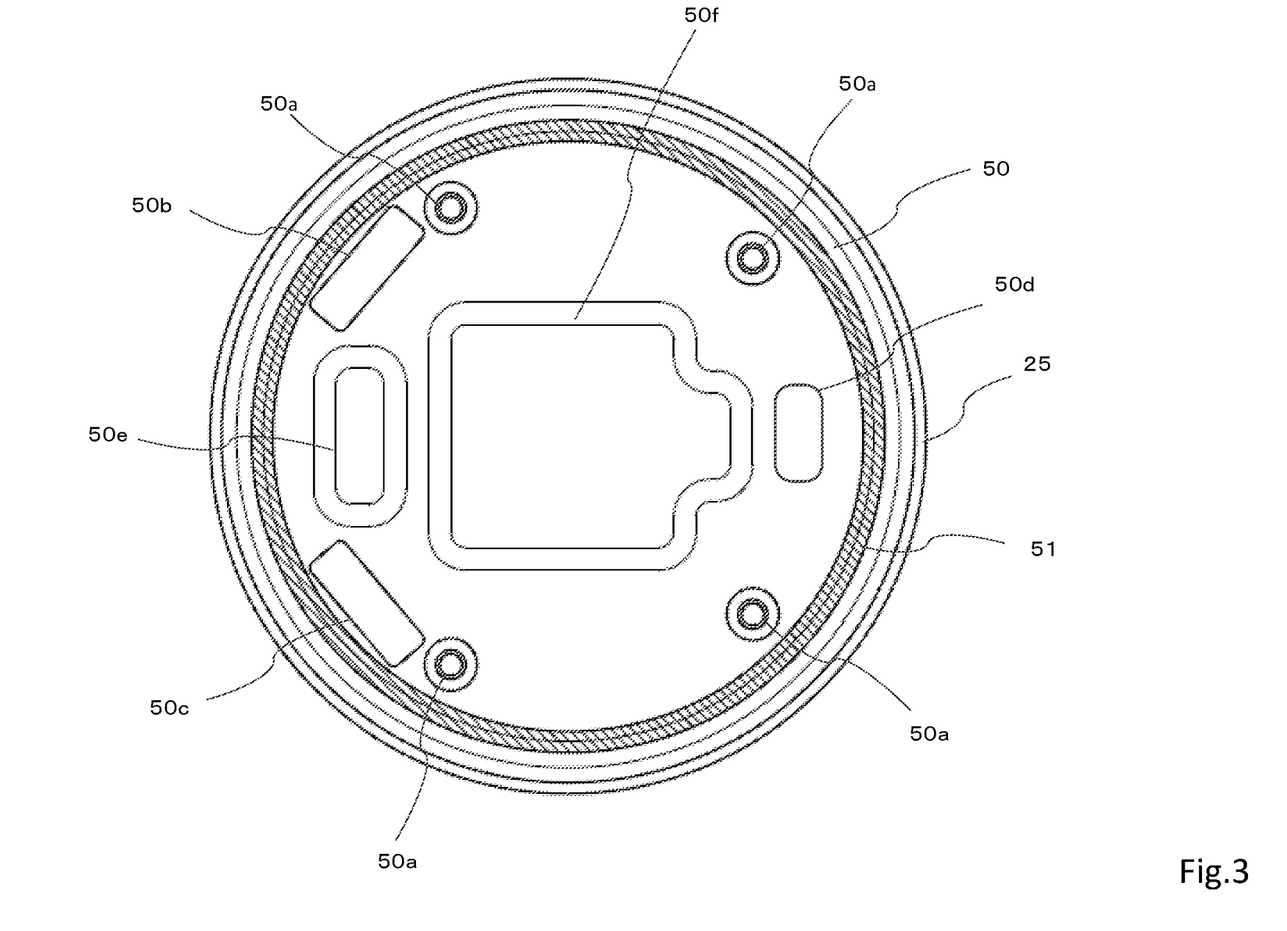
FIG. 3 is a plan view around a filter portion common to the motor control device and the electric power steering control device according to the first and second embodiments of the present invention.

As illustrated in FIG. 3, the shield plate 50 is substantially circular, and its circumference abuts the motor case 25, and as a result, is electrically connected to the motor case 25 such that the shield plate 50 is grounded to the body. Therefore, the degree of suppressing noise emission is increased.

Moreover, as illustrated in FIG. 2, a portion of a lower surface of the shield plate 50 abuts the CPU 10 mounted on the control board 4a, for example. With this abutment structure, heat dissipation property of the CPU 10 is also increased. The heat in this case is conveyed from an upper surface of the CPU 10 to the outside via the shield plate 50 and the motor case 25.

As described above, an outer circumferential portion of the control unit 1 is surrounded by the motor case 25 made of the metal, and the shield plate 50 is arranged between the motor case 25 and the housing 40, with the result that noise emission can be suppressed. Further, the shield plate 50 is electrically connected to the motor case 25, and abuts the component of the control circuit, to thereby provide the structure with which the heat dissipation property is also increased.

Second Embodiment

Next, a second embodiment of the present invention is described with reference to FIG. 3. Parts equivalent to those in the first embodiment are denoted by the same reference symbols. FIG. 3 is an illustration in which the housing 40 is omitted such that an upper surface of the shield plate 50 can be seen.

The upper surface of the shield plate 50 also has a role of fixing the resin member 43, and has four holes 50a for screwing formed therein as illustrated in FIG. 3. Moreover, in a portion opposed to a connection portion between the filter portion 17 and conductive wires in the resin member 43, recessed portions 50e and 50f are formed to provide a gap for avoiding direct contact. Further, the shield plate 50 has formed therein holes through which a plurality of terminal ends of the terminal 44 of the power supply connector 42 pass. In other words, holes 50b and 50c are terminal through-holes for the connector for the sensors 8. A hole 50d is a hole for allowing a power supply conductive wire extending from the terminal 44 of the power supply connector 42 and passing through the filter portion 17 to pass therethrough.

As described above, the plurality of holes are formed in the shield plate 50, but in terms of suppressing noise emission, it is not difficult to design the holes so small as to have no difference as compared to the shield plate 50 without the holes.

Further, in the vicinity of outer circumference of the shield plate 50, an outer circumferential wall 51 made of a resin or rubber is provided, for example. An outer edge portion of the housing 40 may be inserted in the outer circumferential wall 51 such that the outer circumferential wall 51 can be used for fixing the housing 40. Moreover, a waterproof packing 52 (see FIG. 4) made of rubber may be arranged or a sealing compound is applied between the outer circumferential wall 51 and an inner wall of the motor case 25 to secure waterproofness with respect to the outer edge portion of the housing.

As described above, the outer circumferential portion of the control unit 1 is surrounded by the motor case 25 made of a metal, and the shield plate 50 is arranged between the motor case 25 and the housing 40, with the result that noise emission can be suppressed. Further, there is also provided the effect that the structure can be simply used to electrically connect the shield plate 50 to the motor case 25, fix the resin member 43, and secure the waterproofness of the control unit 1.

Third Embodiment

Next, a third embodiment of the present invention is described with reference to FIG. 4. Parts equivalent to those in FIG. 2 are denoted by the same reference symbols.

The third embodiment is different from the first embodiment illustrated in FIG. 2 in the motor case and a case for the control unit 1. In other words, a motor case 225 including the motor 2 is made of an iron-based material, for example, and similarly holds the rotor 23, the motor output shaft 21, the stator 22, and other such components therein. A mounting portion 225a used for mounting to the vehicle body is formed as a member separated from the motor case 225, and the mounting portion 225a and the motor case 225 are fixed with a plurality of bolts. Therefore, mechanical and electrical connection to the vehicle body can be secured when a connecting portion abuts the motor case 225.

Next, the control unit 1 is contained in a case-like frame 228 forming an outer layer thereof, and has the upper portion covered by a lid-like housing 400. In other words, the frame 228 includes an upper recessed portion and a lower recessed portion as internal spaces, and has the structure in which the upper recessed portion contains most of various electronic components of the control unit 1. The lower recessed portion of the frame 228 abuts an outer wall in an upper portion of the motor case 225 to be mechanically and electrically connected to the motor 2.

The frame 228 has the motor output shaft 21 passing through a center thereof, and further has the winding ends 26 of the motor 2 through a circumferential portion thereof. Moreover, the power modules 35a and 35b abut an upper surface of the upper recessed portion of the frame 228. Further, although not shown, the frame 228 has other recessed portions in a part thereof, and the plurality of capacitors 30 illustrated in the circuit of FIG. 1 are separately contained in the recessed portions.

Further, the control board 4a is arranged above the recessed portions of the frame 228, and a shield plate 500 is arranged above the control board 4a, and further the frame 228 has a mounting portion used for mounting to the housing 400 in the circumference thereof. The shield plate 500 partially abuts an electronic component, for example, the CPU 10 of the control board 4a to increase heat dissipation property of the electric components. The circumference of the shield plate 500 abuts the inner circumference of the frame 228 such that the shield plate 500 and the frame 228 are electrically and mechanically connected and fixed.

The housing 400 contains the coil 17b and other such components, which form a part of the filter portion 17 illustrated in FIG. 1, and includes the power supply connector 42 in an upper portion thereof. Electrical connection between the power supply connector 42 and the filter portion 17 is performed with the resin member 43 which includes conductive wires and a substrate 45.

A leg portion of the coil 17b and the terminal of the power supply connector 42 are connected to the conductive wires fixed by the resin member 43, and the capacitors 17a, 17c, 17e1, and 17e2 illustrated in FIG. 1 and the conductive wires are connected with a wiring pattern on the substrate 45. Then, from an end of the substrate 45, a plurality of terminals extend to power supply system terminals for the control board 4a and the power modules 35a and 35b. For the ends of the conductive wires extending from the resin member 43, the shield plate 500 has formed therein a recessed portion, and further the holes for the plurality of terminals. In particular, the holes are formed to be small collectively in a part of the shield plate 500, and hence do not affect the performance of the shield.

As described above, the frame 228 has the lower recessed portion in addition to the upper recessed portion, and the inner circumferential portion of the upper recessed portion is in close contact with the housing 400, and further with the shield plate 500, and the inner circumferential portion of the lower recessed portion is in close contact with the motor case 225.

Figure 4:
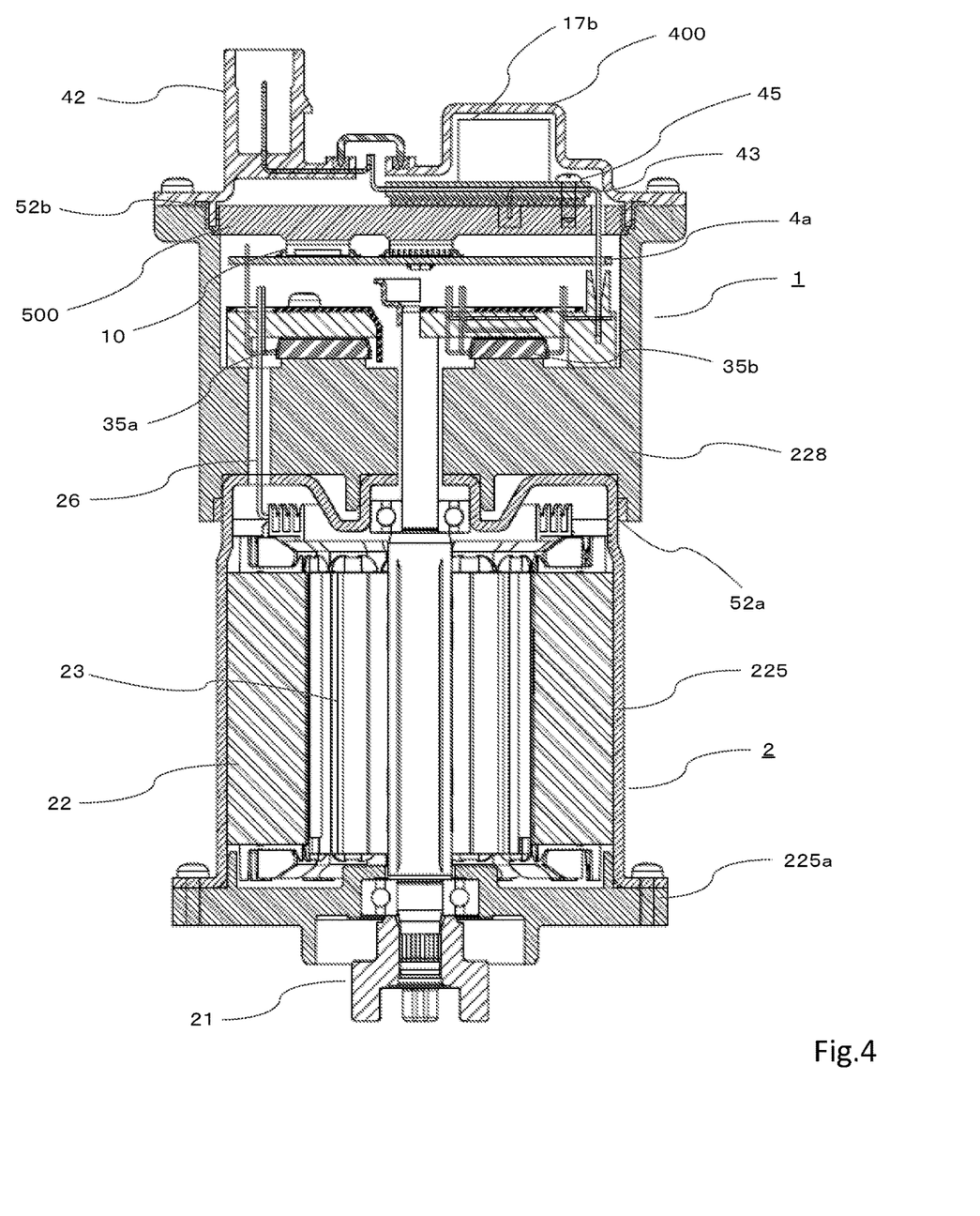
FIG. 4 is a cross-sectional view for illustrating the overall mechanical structure common to a motor control device and an electric power steering control device according to third embodiment& of the present invention.

As illustrated in FIG. 4, a waterproof structure, for example, a packing 52a is partially inserted to an abutment portion between the frame 228 and the motor case 225, with the result that waterproofness can be secured. Similarly, a sealing compound 52b, for example, is also applied as a waterproof structure to an abutment portion between the frame 228 and the housing 400, with the result that the waterproofness and sticking property are easily secured. Needless to say, even in a case in which the frame 228 has a mounting portion used for mounting to the vehicle in a portion thereof, and in which the mounting portion is used for fixing to the vehicle, the shielding performance can be similarly secured.

The frame 228 is structured as described above, and plays a plurality of roles including the role of the case of the control unit 1 and the role of a heat dissipation heat sink for the power modules 35a and 35b, and is made of aluminum, for example.

Meanwhile, the shield plate 500 also plays the role of the shield as well as the roles of the heat dissipation heat sink, holding the substrate 45, and further the lid for the control circuit unit formed of the control board 4a and the power modules 35a and 35b, and when being made of aluminum, has a heat expansion/contraction ratio that is the same as that of the frame 228 to provide a good adhesiveness therebetween. As to the shielding performance, the filter portion and the control circuit unit are separated with the shield plate 500, and the shield plate 500 is grounded to the vehicle body via the frame 228 and the motor case 225 to provide a good shielding performance as in the case of FIG. 2.

The invention claimed is:

1. A motor control device, comprising:
   a motor case including a motor;
   a housing, which is provided to have a power supply connector mounted thereon and cover an upper portion of the motor case; and
   a control unit, which is arranged on a side opposite to an output side on an output shaft of the motor in a space formed by the motor case and the housing,
   wherein the control unit includes:
      a filter portion, which is arranged in an upper portion of the control unit and is connected to the power supply connector;
      a control board, which is arranged below the filter portion and has mounted thereon circuit components configured to supply an electric current to the motor; and
      a shield plate, which is arranged between the filter portion and the control board and is grounded to the motor case,
   wherein a waterproofing member is arranged around an outer circumference of the shield plate, such that an outer circumference of the waterproofing member is outwards from the outer circumference of the shield plate in a radial direction of the motor control device, and
   wherein the motor control device further comprises an outer circumferential wall that is circumferentially formed around the outer circumference of the shield plate, the outer circumferential wall and a wall portion of the motor case having a clearance therebetween, the clearance having the waterproofing member arranged therein.

2. The motor control device according to claim 1, wherein the motor case is made of a metal, and includes a mounting portion configured to mechanically fix and electrically connect the motor case to a vehicle body.

3. The motor control device according to claim 2, wherein the shield plate has an outer circumferential portion that abuts an inner circumferential wall portion of the motor case in the radial direction of the motor control device.

4. The motor control device according to claim 1, wherein the shield plate has an outer circumferential portion that abuts an inner circumferential wall portion of the motor case in the radial direction of the motor control device.

5. The motor control device according to claim 1, wherein the shield plate has formed therein through-holes for a power supply conductive wire and a signal conductive wire that pass through the filter portion, and a recessed portion for arranging a part of components forming the filter portion to be opposed to the shield plate with a gap.

6. The motor control device according to claim 1, wherein the waterproofing member has an outer edge portion of the housing inserted therein.

7. The motor control device according to claim 1, wherein the shield plate has, on a surface on the motor case side thereof, a structure that abuts the circuit components on the control board to dissipate heat.

8. The motor control device according to claim 1, wherein the shield plate has, on a surface on the housing side thereof, a fixing portion for a component forming the filter portion or a conductive wire connected to the filter portion.

9. An electric power steering control device, comprising the motor control device of claim 1, the electric power steering control device being configured to generate steering assistance torque with the motor.

10. A motor control device, comprising:
a motor case including a motor;
a housing, which is provided to have a power supply connector mounted thereon and cover an upper portion of the motor case; and
a control unit, which is arranged on a side opposite to an output side on an output shaft of the motor in a space formed by the motor case and the housing,
wherein the control unit includes:
a filter portion, which is arranged in an upper portion of the control unit and is connected to the power supply connector;
a control board, which is arranged below the filter portion and has mounted thereon circuit components configured to supply an electric current to the motor; and
a shield plate, which is arranged between the filter portion and the control board and is grounded to the motor case,
wherein the motor control device further comprises a frame, which is arranged between the housing and the motor case, and has an upper recessed portion and a lower recessed portion formed therein, the upper recessed portion containing the control unit and the shield plate is within the upper recessed portion of the frame, and
wherein the shield plate abuts, in a radial direction of the motor control device, an inner circumference of an upper portion of the upper recessed portion, the lower recessed portion abutting the motor case.

11. The motor control device according to claim 10, wherein the shield plate has formed therein through-holes for a power supply conductive wire and a signal conductive wire that pass through the filter portion, and a recessed portion for arranging a part of components forming the filter portion to be opposed to the shield plate with a gap.

12. The motor control device according to claim 10, further comprising an outer circumferential wall, which is circumferentially formed around an outer circumference of the shield plate, the outer circumferential wall and a wall portion of the frame having a clearance therebetween, the clearance having a waterproofing member arranged therein, the waterproofing member having an outer edge portion of the housing inserted therein.

13. The motor control device according to claim 10, wherein the shield plate has, on a surface on the motor case side thereof, a structure that abuts the circuit components on the control board to dissipate heat.

14. The motor control device according to claim 10, wherein the shield plate has, on a surface on the housing side thereof, a fixing portion for a component forming the filter portion or a conductive wire connected to the filter portion.

15. A motor control device, comprising:
a motor case including a motor;
a housing, which is provided to have a power supply connector mounted thereon and cover an upper portion of the motor case; and
a control unit, which is arranged on a side opposite to an output side on an output shaft of the motor in a space formed by the motor case and the housing,
wherein the control unit includes:
a filter portion, which is arranged in an upper portion of the control unit and is connected to the power supply connector;
a control board, which is arranged below the filter portion and has mounted thereon circuit components configured to supply an electric current to the motor; and
a shield plate, which is arranged between the filter portion and the control board and is grounded to the motor case, and
wherein the motor control device further comprises an outer circumferential wall, which is circumferentially formed around an outer circumference of the shield plate, the outer circumferential wall and a wall portion of the motor case having a clearance therebetween, the clearance having a waterproofing member arranged therein, the waterproofing member having an outer edge portion of the housing inserted therein.

* * * * *